W. C. BECKWITH.
INNER TUBE FOR TIRE CASINGS.
APPLICATION FILED JUNE 6, 1911.
1,016,122.
Patented Jan. 30, 1912.
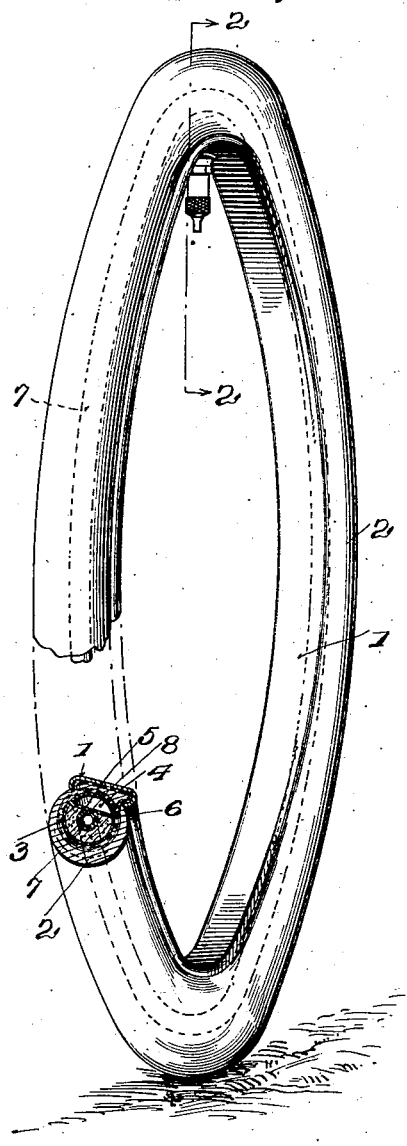
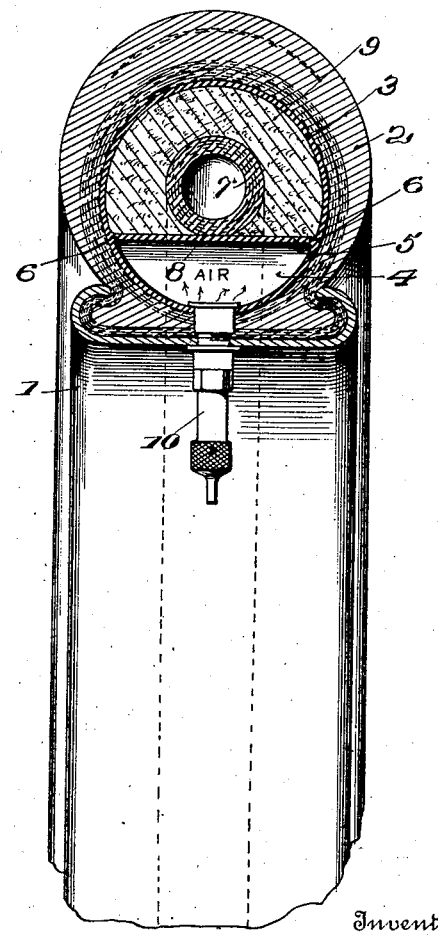
Witnesses
W. A. Williams
C. P. Wright Jr.
Inventor
W. C. Beckwith.
By A. S. Pattison,
Attorney

UNITED STATES PATENT OFFICE.

WALTER C. BECKWITH, OF FOSTORIA, OHIO.

INNER TUBE FOR TIRE-CASINGS.

1,016,122.  Specification of Letters Patent.  Patented Jan. 30, 1912.

Application filed June 6, 1911. Serial No. 631,661.

*To all whom it may concern:*

Be it known that I, WALTER C. BECKWITH, a citizen of the United States, residing at Fostoria, in the county of Seneca and State of Ohio, have invented certain new and useful Improvements in Inner Tubes for Tire-Casings, of which the following is a specification, reference being had therein to the accompanying drawing.

This invention relates to improvements in inner tubes for tire casings, and is particularly intended for use in connection with the clencher form of automobile tire casing.

The primary object of my present invention is to provide a new article of manufacture comprising an elastic envelop having an annular inflatable and deflatable air-chamber at its inner side, formed by an annular elastic partition within the said envelop, an annular thick wall tube located between the said partition and the tread side of the envelop and elastic filling around the said thick wall tube and between the said partition and the tread-side of the inner tube.

In the accompanying drawings—Figure 1 is a perspective view of a clencher tire casing and rim, the tire and rim shown in section with my improved inner tube therein. Fig. 2 is an enlarged transverse sectional view of a clencher tire casing and rim showing my improved inner tube in position therein.

This improved inner tube is particularly intended for use in connection with a clencher tire casing, whereby the clencher casing can be applied to and detached from the clencher rim with the inner tube in position therein, and at the same time provide an inner tube which is practically non-puncturable and which will enable the outer casing to be worn practically down to the inner tube without a "blow out" which is so common with inner tubes in common use, when the casing becomes cracked, or so weakened that the ordinary inner tube blows through the weakened, cut or punctured portion of the casing.

Referring now to the drawings, 1 indicates the ordinary clencher rim and 2 the ordinary clencher casing, the construction and operation of both being so well understood by those skilled in the art that more detailed description is unnecessary.

My improved inner tube comprises an annular rubber envelop 3, which is provided at its inner side with an annular air-chamber 4. This air-chamber 4 is formed by an annular rubber partition 5 located within the envelop 3, and having its edges 6 integral with the envelop or vulcanized thereto. Placed within the envelop 3 and between its tread-side and the said partition 5, is a thick wall annular tube 7. This thick wall tube is formed of a combination of rubber and fabric so that it is flexible. The partition 5 and tube 7 are secured together at the point 8 in the manufacture of this improved inner tube. With these parts secured in the position described, the space around the thick wall tube 7 and between it, the partition and the tread side of the envelop 3, an elastic core filling 9 is placed. This elastic core is preferably of such nature that it is placed within the envelop in a liquid or semi-liquid form, after which it solidifies into a solid elastic body and is preferably of a non-rubber nature. The air within the thick wall tube 7 is simply at atmospheric pressure and is for the purpose of lightening the inner tube by lessening the amount of elastic core 9 required, and forms a supporting wall for that portion of the core which is in engagement with the thick wall tube 7.

In operation air is forced into the air-chamber 4, through the ordinary form of valve 10, and this places the partition 4 under pressure and supports the elastic core 9 and thick wall tube 7. The thick wall tube 7 in addition to lightening the inner tube also serves to form the elastic core of substantially the same thickness throughout and thereby places all portions of the elastic core under substantially the same pressure. The pressure in the air-chamber places pressure on the elastic core and this in turn places a pressure on the thick wall tube 7, which is of sufficient thickness to withstand the required pressure to support the weight placed on the tire without collapsing, and in the relation shown herein, constitutes a non-collapsible flexible tube, it is non-collapsible in that the pressure all around it is equal in all directions, and by reason of its thick wall withstands this pressure without collapsing and without any pressure therein above atmospheric pressure.

The foregoing construction produces an inner tube in which the elastic core performs all of its functions of being non-puncturable and of preventing "blow outs" the same as though the whole space between the partition 5 and the tread side of the envelop 3 were completely filled with the elastic core 9. As stated, the thick wall non-collapsible tube 7 serves the double function of lightening an elastic core inner tube, and of causing an equal pressure upon all parts of the elastic core without robbing it of its advantages heretofore referred to.

The objects of having the air chamber 4 is to enable the inner side of the inner tube to be deflated so that the clencher portion of the casing 2 may be removed from the rim 1 and also deflated so that the inner tube can be placed in the casing in the manner in which the ordinary inner tubes are placed therein and the case interlocked with the rim, and the air-chamber inflated which will lock the casing to the rim. An inner tube of this construction has all the advantages of an inner tube which is completely filled with an elastic core with the advantages that the inner tube can be placed within a clenched casing and removed therefrom which is not true when the inner tube is completely filled with an elastic core.

Having thus described my invention, what I claim and desire to secure by Letters Patent is:

An improved article of manufacture for the purpose described, comprising an annular tubular rubber envelop having an annular rubber partition adjacent its inner side to form an inflatable and deflatable annular air-chamber, a thick wall non-collapsible annular flexible tube located between the partition and the outside of the envelop, the inner periphery of the tube resting against and secured to the partition, and an elastic core filling the space between the tube, the partition and the outside of the envelop.

In testimony whereof I hereunto affix my signature in the presence of two witnesses.

WALTER C. BECKWITH.

Witnesses:
 FLORENCE ELLISON,
 CLARENCE B. BROWN.